Dec. 13, 1966     D. SILVERMAN ETAL     3,290,770
METHOD OF SIMULTANEOUSLY DEFORMING TWO OVERLAPPING
TUBULAR METAL ELEMENTS TO FORM INTERLOCKING RIDGES
Filed May 13, 1965     3 Sheets-Sheet 1

Daniel Silverman
Harold M. Lang   INVENTORS

6(b)

6(c)

6(d)

6(e)

INVENTORS

United States Patent Office 3,290,770
Patented Dec. 13, 1966

3,290,770
METHOD OF SIMULTANEOUSLY DEFORMING TWO OVERLAPPING TUBULAR METAL ELEMENTS TO FORM INTERLOCKING RIDGES
Daniel Silverman, 5969 S. Birmingham St., and Harold M. Lang, 2606 E. 33rd Place, both of Tulsa, Okla.
Filed May 13, 1965, Ser. No. 455,556
44 Claims. (Cl. 29—421)

This application is a continuation-in-part of our copending application Serial Number 250,417, filed Jan. 9, 1963, entitled "Coupling Means for Tubular Elements," now abandoned.

This invention relates to methods for joining together tubular metal elements to form structures of various geometrical construction. More particularly it concerns the joining of tubular elements in pairs, by forming an overlapped section, and explosively deforming the two elements simultaneously in contact with each other and with a substantially undeformable encircling third element of the proper surface contour, to form one or more circumferential, or partially circumferential, interlocking ridges and depressions in the mating surfaces of said elements.

Means are available in the market for joining pipes, such as by the use of threaded collars, welding, clamped couplings, etc. These methods are not entirely satisfactory, each type having one or more serious difficulties, and disadvantages. One of the most important disadvantages is that, in order to provide longitudinal tensile, or torsional strength in the joint, threads, grooves or other devices which remove metal and make the wall thinner must be used. This weakens the pipe at the areas where the metal is removed and requires strengthening of the entire pipe to compensate.

In this invention the pressure sealing contact is obtained by overlapping the two elements and explosively driving one element into intimate contact with the other element. In addition, we provide tensile and torsional strength to the joint by forming interlocking ridges or convolutions in the mating surfaces of the two elements by simultaneously deforming the two elements in contact with a third specially shaped, substantially rigid, encircling ring or anvil. The anvil can have depressions in its inner surface so that the outer element is deformed or bulged outward into the depressions (and the inner element also) to form a ridge on the outside of the outer element. Or the anvil can have ridges on its inside surface, and the explosive internal pressure will deform the outer element over and around these ridges (and the inner element also) to form depressions in the outer surface of the outer element. Corresponding bulges or depressions are formed on the outer surface of the inner element, and, of course, corresponding matching depressions or bulges on the inner surface of the outer element, which interlock intimately together to provide tensile and torsional strength to the joint. While we prefer to have continuous circumferential ridges or depressions in the walls of the elements, they need not be continuous but can be placed in any desired pattern. The encircling anvil or ring can have a circumferential pattern of depressions or projections, continuous or discontinuous, and since there is simultaneous deformation of the two elements, their interlocking projections or ridges will be in exact conformity with each other and with the pattern on the ring or anvil.

The anvil is a substantially undeformable ring against which the elements are deformed to take on the contour of the inner surface of the anvil. While no material is truly undeformable, some have greater yield strength than others, and what we desire is that the strength of the encircling ring or anvil be greater than that of the tubular elements, and it thus has the ability to withstand greater tensile stress without substantial deformation. The elements will thus bulge outwardly into the convolution of the ring. While the internal surface of the ring can be considered as cylindrical, with depressions or projections on its inner surface, these convolutions make this surface depart from a true cylindrical surface. The ring can thus be characterized as having a non-cylindrical inner surface.

The encircling ring or anvil can be removable, or fixed. If removable, it can be an assembly of two or more closely fitting parts that are hinged or bolted or otherwise clamped around the outer element. It can also be a single ring of metal, closely fitted around the outer element. The cross-sectional shape of the ring is such as to provide circumferential depressions or ridges in the elements similar to the contour of the inner surface of the ring, against which the elements are forced by internal explosive pressure. The cross section of the ring can be a portion of a circle, or oval (with curved portions facing inward) or it can be square or rectangle with rounded corners, or it can be a rectangle with projections or depressions on the inner surface, etc. In general, if the ring is not removable, it will generally be of lesser axial extent than if it is removable.

The shock force required to deform the elements is derived from the detonation of a volume of explosive composition. For the case of small diameter tubular elements, where small amounts of explosive are required, the explosive composition can be placed inside the inner element in direct contact with the metal surface of the element. Where the diameter of the elements is larger, and the volume of composition required is less than the amount that would be needed to completely fill and contact the internal wall of the inner element, the explosive shock force of the detonation can then be transmitted from the composition to the elements by filling the annular space between them with an explosive shock force transmitting material that is in intimate shock force transmitting contact with the composition and with the element.

This shock force transmitting medium is a means for carrying the shock force substantially undiminished from the explosive source (except for radial divergence) to any desired portion of the work piece. Thus the axial extent of this material need only be as great as that portion of the elements that are to be deformed, which is generally comparable to the axial dimension of the groove or ridge pattern of the ring or anvil.

The two elements that are to be joined need not both be long pipes. One of them can be a short length of tube which is used as a coupling element or collar. In this case, one pipe element is deformed in and with one end of the collar and another pipe element is deformed in and with the other end. The joining of the collar to the two pipe ends can be done separately or simultaneously. Or the end of one pipe can be belled out to form an overlap area with the unbelled end of another pipe. Or a rod element can be joined with a tube element by drilling or boring a central hole in one end of the rod to form a short tubular wall, which is overlapped with the tubing element, and so on.

The principal objective of this invention is to accomplish the joining of two overlapped metal tubular elements by simultaneously mutually deforming the two layers to the contour of a third substantially undeformable ring element encircling the two layers, and thus forming between the two elements, interlocking ridges and depressions. Another object of this invention is to accomplish the joining of two overlapping tubular metal elements by simultaneously mutually deforming the two layers to the contour of an encircling metal ring about which the two layers are deformed and interlocked with each other and with the ring. Another object is to join and seal the space between two overlapping tubular metal elements by the placing of a ring of deformable incompressible sealing material between the two elements and explosively deforming and interlocking the two layers to the contour of an encircling ring and the interelement ring of sealing material.

Other objects and advantages of this invention will become apparent from the following description and drawings, in which.

FIGURES 6a, 6b, 6c, 6d, and 6e show embodiments in which the encircling ring is not removable, and when the elements are deformed about the ring, it becomes part of the joint structure.

Figure 7:
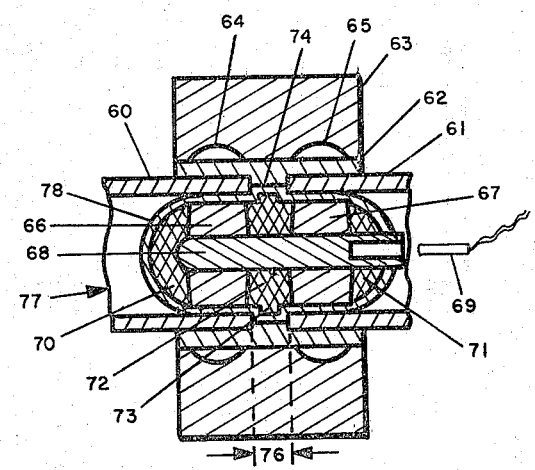
Figure 8:
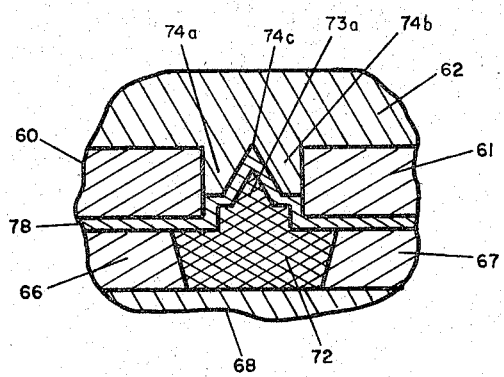
Figure 9:
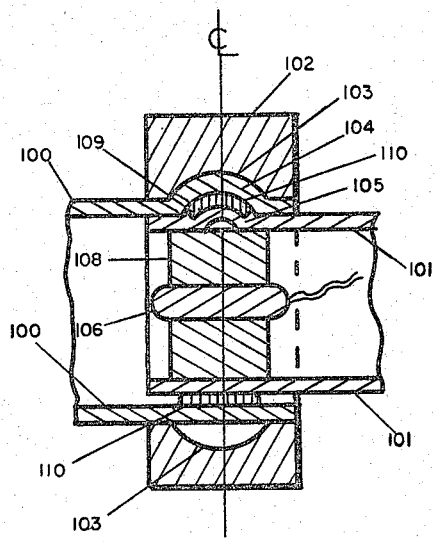

FIGURES 7, 8, and 9 show other embodiments, and FIGURES 10a, 10b, 10c, 10d, and 10e show other embodiments of this invention in which a ring of deformable incompressible material is placed in the interelement space between the two overlapping elements prior to the deformation.

Referring to the figures, and in particular to FIGURE 1, we show schematically in cross section one embodiment of our invention. Two metal tubular elements 10 and 11 have such diameters that they can fit in slip fit engagement into the overlapped position shown. The amount of overlap is a function of the diameter of the element, their wall thickness, and other factors such as the dimensions of the circumferential depression 15. However, we prefer that the amount of overlap be not less than the radius of the inner pipe. While there is no upper limit to the amount of overlap, it will generally not be necessary or desirable to overlap more than four times the radius of the inner element.

The elements can be pipes or tubes of the same or different metals, wall thickness, etc., but are preferably the same material and of substantially the same wall thickness. One or both elements can be formed from rods like 21, by drilling out a circular opening to form a tubular wall 10.

Figure 1A:
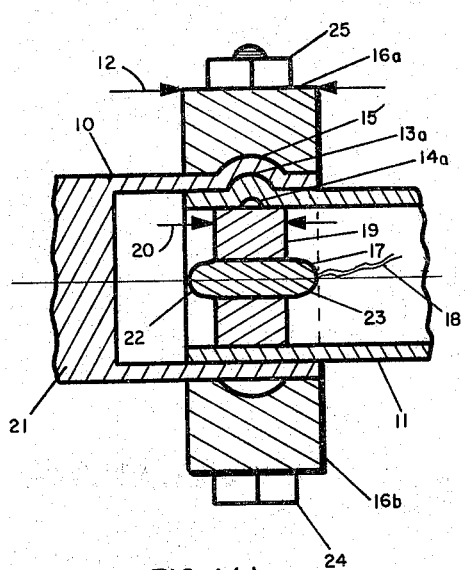
FIGURES 1a and 1b show in cross section and end view respectively, one embodiment of this invention in which two overlapping tubular elements are joined.
Figure 1B:
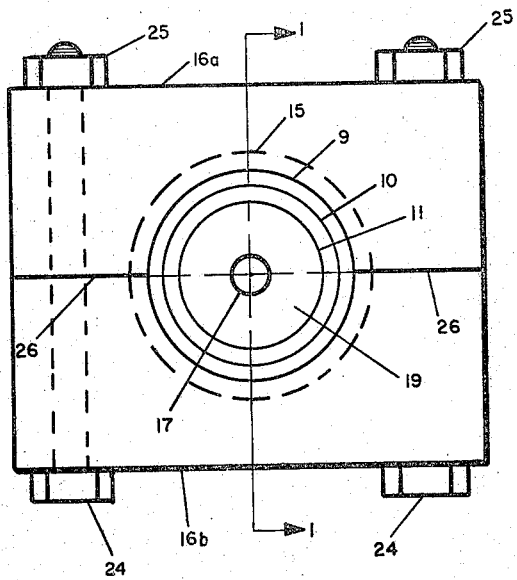

In most cases the tubular elements 10 and 11, FIGURE 1a, 1b, will be right circular cylinders although they need not be. They can be of any desired cross sections such as round, square, triangular, oval, and so on. They must, however, be of substantially the same cross-sectional shape and of the same shape as that of the anvil 16. The invention will, for convenience, be illustrated in connection with right circular cylindrical elements.

Surrounding the elements 10, 11, is a heavy walled, substantially undeformable ring or anvil 16. This can be made removable, by being formed of two or more pieces of metal 16a, 16b, adapted to fit together along a diametral plane 26, and bored out to the proper diameter and internal contour 9 to fit the outer element 10. These parts can be held together by clamps, bolts and nuts 24, 25, or by hinges 35 and bolts, etc., as is well known in the art.

The purpose of the ring or anvil 16 is to form a die against which the overlapped layers 10 and 11 are forced by internal explosive pressure, to be deformed to the convolutions of the internal surface 9 of the ring, and the circumferential depression 15. In the lower part of FIGURE 1a, we show the elements in their original inserted shape and position, while in the upper portion we show the shape of the elements 10 and 11 after they have been deformed to the contour of 9 and 15. A portion of the element 10 has been bulged 13a into the depression 15, while the element 11 has been simultaneously bulged 14a into the depressions so formed in the inner surface of the element 10. The outer surface of the inner element 11 has an outer bulge or ridge 14a, which fits exactly and interlocks with a corresponding depression in the inner surface of the outer element. These interlocking ridges and depressions in the mating surfaces of 10 and 11 serve to provide torsional and tensile strength to the joint, while the pressure seal is formed by the intimate radial contact of the two surfaces due to the explosive shock force.

The depression 15 can be completely circumferential, or it can be made in segments. The latter give greater resistance to relative rotational motion of the two elements after the joint is formed. Also, instead of a depression 15 in the surface 9 of the ring 16, as will be shown later, the convolutions can be ridges or projections. Or the entire ring can be a single piece, non-removable, toroidal shaped metal ring about which the elements are deformed and which stays with the deformed elements. This will be more fully explained in connection with FIGURE 6.

The axial and radial dimensions of the depression 15 must be such that when the element 10 is driven into the depression 13a, there will be a sufficiently sizeable depression in the inner surface of 10 such that the inner element 11 can be driven into that depression 14a, forming a corresponding ridge in the outer surface of 11 that locks with the depression in the inner surface of 10. If the depression 15 is too small, while it might be filled with the material of 10, there will not be sufficient interlocking between 13a and 14a. While the depression 15 (and corresponding depressions in other patterns than a single circumferential depression) can be of any desired size or shape, we prefer that the axial dimension be at least equal to the thickness of the material of which the elements are constructed, and preferably within the range of one to four times the wall thickness of the elements.

The explosive shock force is derived from a volume of explosive composition, with detonating means 18 well known in the art. Preferably the composition 17 is of elongate form, along the axis of the elements. The composition 17 is held in position by an annular ring or short cylinder 19 of material that serves also to conduct or transmit, with minimum loss or absorption, the explosive shock force from the explosive to the inner element. This explosive shock force transmitting material is characterized as being substantially incompressible, deformable, and non-porous. It can be a solid or a jell of sufficient rigidity to maintain its shape, such as elastomeric material, grease, wax, etc. It can also be a weaker jell or liquid contained in a thin-walled deformable plastic capsule as will be explained below. Also it can be a friable solid which, on detonation of the explosive composition, will be shattered and broken into a fine powder.

In order to transmit the shock force substantially undiminished, the shock force transmitting material must be in shock force transmitting contact with the explosive and with the metal work piece. No substantial part of the path from the explosive through the material to the element should be composed of air or porous, compressible material with substantial internal friction losses, or else the strength of the transmitted shock force will be diminished. Such materials as waxes, greases, hard rubber, deformable plastic and similar materials, as well as friable solids such as plaster of paris can be used as the force transmitting material. However, they must be in firm, intimate, contiguous contact with the composition and the work piece. The shape and dimensions of the shock force transmitting material serve to limit the area of the work piece against which the shock force is directed. Thus the axial dimension 20 of the ring 19 should be a litter wider than the depression 15, but it need not be greater than the full width of the ring 16, for example, except for special considerations, as will be discussed below. If the material 19 is wider than the ring 16 it will tend to bulge the tubes outward where they are unsupported by the anvil, and where it may not be desired to have the tubes bulged. This would be undesirable in the embodiment of FIGURE 1, although, as will be shown in connection with FIGURE 6, it is sometimes very much desired.

The overhanging portion 22 and 23 of the explosive composition 17 while they do exert some pressure on the elements, will not substantially affect the shape of the elements after deformation, and certainly not as much as the shock force transmitted by material 19. The air surrounding the portions 22 and 23 is a poor transmitter of shock force, so that the magnitude of force reaching the inner element through the air will, in general, be insufficient to substantially deform the elements outside the region of contact of material 19 with the inner element. The portions 22 and 23 are shown for purpose of illustration as quite sizeable. However, there is no need for the explosive material to extend substantially beyond the surfaces of the rings of force transmitting material. The same consideration holds for these cases where, as in FIGURE 2, there are two or more rings of force transmitting material surrounding the same single volume of explosive composition. The portion of the composition joining the two rings of material serve a useful purpose in joining the detonation of the two ends of the explosive, while the air coupling, between this explosive and the elements has a minor effect on the deformation. Similarly, the insertion of a porous material, as in FIGURES 7 and 8, which does not efficiently transmit short shock forces, serve to shield the element from the explosive shock force arising from that portion of the explosive composition.

FIGURE 1b shows in end view the relation of the two elements, the explosive assembly of 17 and 19, and the construction of the ring or anvil 16, which is held together by bolts and nuts 24 and 25. Other means of clamping the anvil about the elements, such as the hinge (FIGURE 3) or other means well known in the art may be used.

The amount and kind of explosive composition 17 required to deform the overlapped elements depends, of course, on the diameter, thickness and material of the elements. The type of explosive composition is not critical so long as it is capable of detonation at a high velocity. We have found that 25 grains of P.E.T.N. (Penta Erythritol Tetra Nitrate) is sufficient to interlock in this fashion two aluminum tubes of one inch diameter and 1/16 inch wall thickness. Also a 2 inch diameter steel tubing of .083 inch wall thickness can be interlocked by deformation in this manner, with 50 grains of P.E.T.N. explosive composition.

Figure 2A:
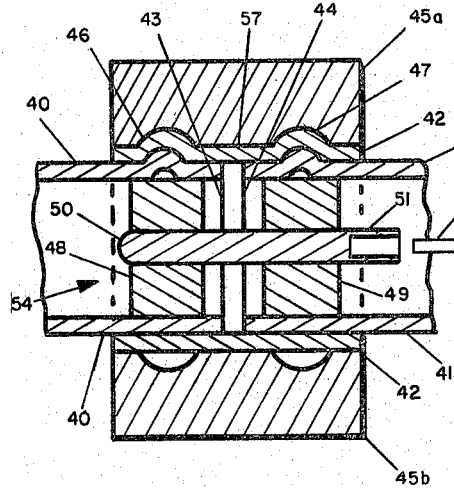
FIGURES 2a and 2b show in cross section and end view respectively, another embodiment in which two similar tubular elements are joined to a third overlapping tubular collar.

In FIGURE 2 we show how the process of FIGURE 1 can be used to simultaneously join the ends 40 and 41 of two long tubular elements to a third short tubular element, collar, or coupling 42. In this case the elements 42 and 41 correspond to 10 and 11 of FIGURE 1. The anvil 45 is now considerably wider, covering substantially the full length of the collar or element 42. The amount of overlap of 42 to 41 and 40 is based on the same considerations as in FIGURE 1. We show two circumferential depressions 46, 47, each corresponding to the depression 15 of FIGURE 1, and each approximately centered over the overlapped sections. As will be shown in connection with FIGURE 3, each end of the element 42 could have two or more rows of depressions in any desired pattern.

The explosive assembly 54 comprises an elongated explosive composition 50 with 2 rings 48, 49, of shock force transmitting material to conduct the shock force simultaneously to the two overlapped sections and to deform them respectively to the contour of the two depressions. The properties of the shock force transmitting materials 48, 49, are, of course, the same as those for the material 19 of FIGURE 1, etc. The explosive composition 50 may have a tubular extension 51 into which a separate detonator 52 can be inserted and fired by means of the wires 53, for example, all of which is well known in the art and need not be discussed further. Thus the explosive composition can have a self contained detonator, or a separable detonator.

The two ends 43, 44, of the pipes 40, 41, may be separated a short distance for reasons which will be explained below.

Figure 2B:
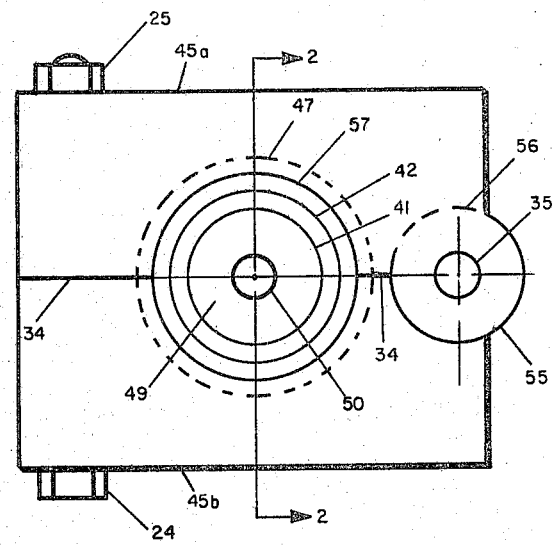

The anvil 45, can be, as shown in FIGURE 2b, made in the form of two hinged semicircular parts 45a, and 45b, which fit together along a diametral plane 34. They have projections 55 and 56 which interleave with each other as a hinge, and are bored to take the hinge pin 35. Thus, only one set of bolts and nuts 24, 25, need to be fastened to secure the anvil 45 about the element 42. After the deformation is complete, the anvil can be removed by removing nuts 25 and opening the hinged halves of the anvil.

As in the case of FIGURE 1, we show in FIGURE 2 both the initial shape and position of the elements 40, 41, within the elements 42 (in the lower half of the figure) and the resulting deformed shape (in the upper half of the figure). It will be clear that the mating surfaces between 40 and 42 and between 41 and 42 are locked together by interlocking projections and depressions in the same pattern of projections and/or depressions which is provided in the internal surface 57 of the anvil 45.

Figure 3:
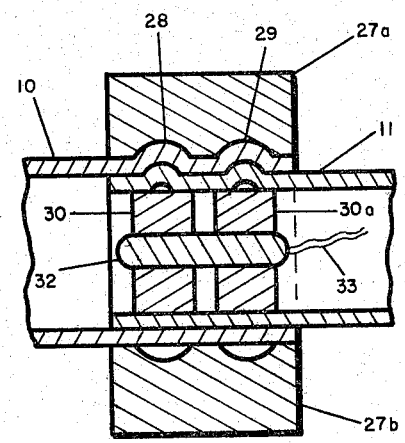
FIGURE 3 shows an embodiment like that of FIGURE 1 in which two circumferential depressions are placed on the internal surface of the encircling anvil ring.

In FIGURE 3 we show an embodiment of FIGURE 1 in which the length of overlap of the two elements 10 and 11 is increased so as to provide an array or pattern of depressions comprising at least two circumferential depressions 28 and 29, or a greater number of shorter depressions in a predetermined pattern of depressions. The central elongated explosive composition 32 has as many separate rings of shock force transmitting material 30, 30a, as are needed to properly direct the shock force to the overlapped elements. If the two rows of depressions 28, 29, are substantially separated, then two separate rings 30, 30a, should be used, and correspondingly more than two, if there are more than 2 spaced rows of depressions. On the other hand, if the pattern of depressions is a closely spaced one, then a single wide ring of force transmitting material might be used. Thus there can be one or more depressions and correspondingly one or more separate rings of shock force transmitting material.

Figure 4:
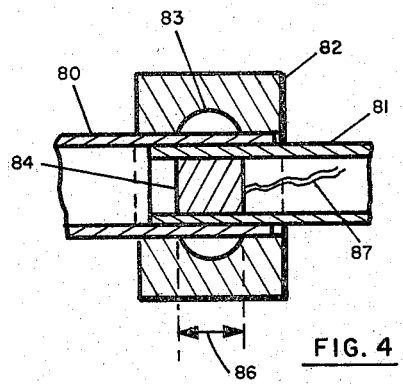
FIGURES 4 and 5 show the embodiments of FIGURES 1 and 3 where small diameter elements are used and the explosive composition is placed in direct contact with the inner element.

In the event that the tubular elements are small, the volume of explosive composition needed to deform the elements may be enough to completely fill a short axial section of the inner element. This is shown in FIGURE 4 where the explosive composition 84 is in intimate shock force transmitting contact with the inner surface of the inner element 81. Its axial dimension 86 is sufficient to supply shock force to an appropriate length of the elements to bulge them into the depression 83 in ring 82.

Figure 5:
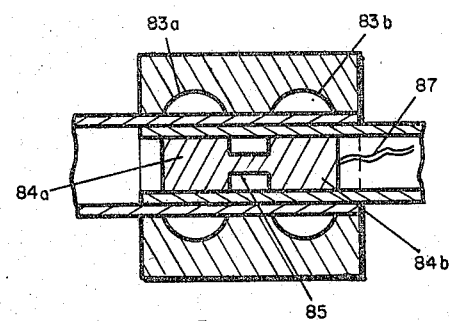

Similarly as in FIGURE 5, if it is decided to provide two or more rows of depressions 83a, 83b, then two or more volumes of explosive composition 84a, 84b, can be used. These may be joined with a thin bridge or link of explosive composition 85 to carry the detonation from the volume 84b to the volume 84a.

So far we have shown embodiments in which the supporting ring or anvil is removably fastened or clamped around the overlapped elements. After the detonation, the anvil will be in tension due to the outward pressure of the tubing elements, and conversely, the outer element will be in compression, pressing inwardly against the inner element. Upon loosening the nuts 25 and removing the restraint of the anvil, there will be a tendency for the outer element to expand slightly. And also the inner element, previously compressed by the outer element, will tend to expand outwardly as the outer element does. If they both expand by the same amount, then to tightness of the joint will not be affected. However, to avoid this possibility we illustrate in FIGURE 6 an embodiment in which the restraining ring or anvil is not removable.

The supporting ring can be a forged, cast, welded, machined, or otherwise fabricated high yield strength ring. It should be of substantially the same inner diameter as the outer diameter of the outer element, preferably with firm sliding fit so that it can be positioned easily. Conversely, in the preparation of the tubing element such as 90 of FIGURE 6a, the rings can be pressed on to the proper position at the time of the fabrication of the rings and the tubing. The rings can be of different cross sections as shown in FIGURE 6a, 6b, 6c, 6d, and 6e. Although a ring of the shape of 92a of FIGURE 6a will never be as rigid and undeformable as the much heavier anvil 16 of FIGURE 1, to the extent that it is stretched outward by the explosive force, it will have internal tension and it will exert a confining or compressive force on the outer element tending to hold it in intimate contact with the inner element. The ring 92 of FIGURE 6 if made of high yield strength material and if stressed to a value below its yield strength, will be stretched, and will thus be finitely deformable. However, since it is much less deformable than the tubular elements, we may still characterize it as being substantially undeformable (as compared to the deformable tubular elements).

Figure 6A:
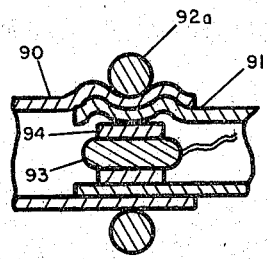

The cross sections of 92 shown in the five parts of FIGURE 6 are only a few examples of the many possible patterns of ridges and depressions, or hills and valleys, that can be formed in the ring 92 about which the elements will be deformed. FIGURE 6d shows a circumferential depression similar to that of the anvil of FIGURE 1. FIGURE 6e shows a ring with a pattern of small depressions. The other three show various types of circumferential ridges. The example of FIGURES 6a and 6c show two types that can be constructed very simply and inexpensively, in which the ring itself is a circumferential ridge.

It is obvious that ring 92a has an internal surface that departs from a cylindrical surface. Similarly, ring 92c, with its rounded off internal corners also departs from a cylindrical surface. Even if the corners were sharp, as in the case of ring 92d, the intense shock force applied at these corners would cause flow of metal to round off the corners and make the ring depart from a cylindrical surface. However, even if the inner surface were cylindrical, if the axial length of the ring is less than the length of the overlap section, and more importantly, less than the length of the shock force transmitting material, the elements will be bulged out around the ring as shown in FIGURE 6a. So far as the joint is concerned, there is a restraint against part of the outer surface of the overlapped elements and a lack of restraint, or a freedom to expand, over another part of the outer surface of the overlapped elements. It is this *relative* expansion, or buldging, of *parts* of the surface which are unrestrained, relative to the confinement of other parts of the surface, which creates the internal ridges and depressions. For this purpose therefore, it is immaterial whether the areas of freedom and confinement are in the inner surface of an *axially long* ring, which departs from a cylindrical surface, or whether the ring is short and the shock force is applied to portions of the elements outside the limits of the ring. In this case the internal surface of the short ring may depart from a cylindrical surface, or it may be a true cylindrical surface.

In FIGURE 1 we showed how the ring of shock force transmitting material 19 serves two purposes. Supported as it is, by the inner element, with which it is in intimate shock force transmitting contact, it serves to support the explosive element. In addition, of course, it serves to transmit the explosive shock force from the explosive to the inner element. Also, in FIGURE 2, we showed how it is possible in positioning the two elements 40 and 41 into the collar element 42, to leave a short gap between the ends 43 and 44. This gap can be used to assist and simplify the assembly of the joint, as illustrated in FIGURE 7.

Here we show an embodiment similar to that of FIGURE 2. However, the gap 76 between the ends of the two elements 60 and 61 serves to center the third element 62, and the explosive assembly 77. The coupling element 62 has an internal ridge 74 of width 76 equal to the desired spacing between the ends of the elements to be coupled. The circumferential ridge 74 serves as a stop to limit the position of the elements 60 and 61 inside the element 62. In a similar manner we provide a central supporting ring 72 adapted to properly space the rings of force transmitting material 66 and 67, and by the circumferential ridge 73, the explosive assembly 77 can likewise be centered so that the rings 66 and 67 lie in proper position with respect to the depression 64 and 65 in the anvil 63.

The supporting ring 72 must be made of a porous, compressible, non-shock-force-transmitting material, such as paper, compressed or cemented sawdust, foam plastic and the like. These materials have sufficiently good mechanical properties to space and center the parts of the explosive assembly 77, and yet will not transmit, without large attenuation, the shock force of the explosive. In the explosive assembly 77, the explosive composition 68 is threaded through the supporting porous compressible ring 72 and the two incompressible non-porous deformable shock force transmitting rings 66, 67, to make a substantially rigid assembly.

If desired, the hemispherical volumes 70 and 71 can be added, likewise made of this same compressible material as ring 72. Also, the assembly of parts 66, 67, 68, 70, 71, and 72, can be enclosed in a thin walled flexible plastic case or capsule 78, to add mechanical strength for handling, etc. An opening is provided in the end 71 to permit insertion of the detonator 69 into contact with the explosive composition 68.

If desired, the internal ridge 74 in the collar 62 of FIGURE 7 can be formed with a center depression 74c (FIGURE 8) giving the effect of two ridges 74a, 74b. The intervening depression serves to lock the ridge 73a of the ring 72 and hold together the coupling collar 62 and the explosive assembly 77 for easier handling, shipment, and installations.

In FIGURE 9 we show another embodiment of this invention in which an interelement layer of incompressible, deformable material 110 is placed in the annular space between the two tubular elements 100, 101. As before, the two elements are inserted, one into the other forming an overlap section, the anvil 102 is placed in position, the explosive assembly, comprising explosive composition 106 and ring 108 of shock force transmitting material, is in place. When the explosive is detonated, the elements are deformed into the form 104 and 105, with the mating faces including the thin interelement layer 110.

If a loose mechanical joint, or swivel joint is desired, it is possible to make the interelement layer removable. During the detonation, this layer prevents direct contact between the two elements, keeping them spaced apart by the thickness of this interelement layer. When the layer is removed, it provides a narrow air space which provides freedom for relative motion of the two elements. This is particularly so if the mating surfaces 109 are substantially spherical. To create this space the interelement material 110 can be wax or grease, for example, which can later be removed by heat or solvent. If the incompressible interelement layer 110 is a thin film or layer of plastic or rubber-like material, it will be under compression in the deformed condition and so will assist in forming a better pressure seal at the joint.

Figure 10A:
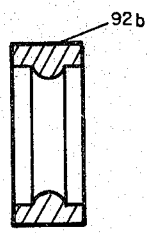
Figure 10A:
Figure 10A:
Figure 10A:
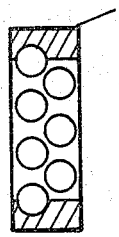
Figure 10A:
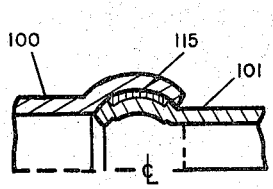
Figure 10C:
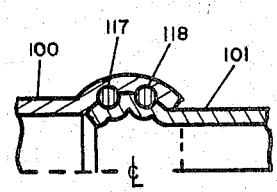
Figure 10B:
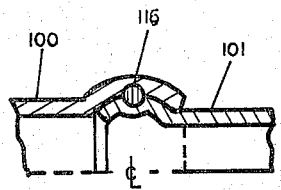
Figure 10D:
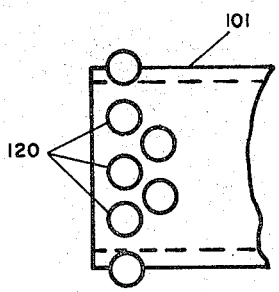
Figure 10E:
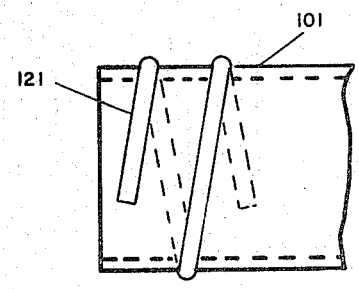

The interelement incompressible layer 110 need not cover completely the mating surfaces of the elements, but may cover only a limited circumferential band. This is illustrated schematically in FIGURE 10a where the incompressible interelement layer 115 is isolated in the center of the deformed section. It separates and seals the two layers while on both sides, of it, axially, it is confined to the two elements which are in intimate mechanical contact 109. With the limited extent of the interelement layer it will be clear that the interlocking action of the explosive force is not directly dependent alone on the contour of the encircling ring or anvil, but also on the specific cross section of the interelement layer. These can, of course, together be designed to provide the proper extent of interlocking ridges and depressions in the mating surfaces of the elements. The interelement layer can, of course, consist of a small diameter O ring 116 which ideally provides good pressure sealing action. This is shown in FIGURE 10b, while in FIGURE 10c is shown the case of two O rings, 117, 118, etc. Also, if the interelement layer is in the form of a thin layer of wax, grease, or other soluble material, it can be easily removed from the joint after the deformation, by the action of the solvent or by heating. Other forms of this interelement incompressible layer can be used, such as a thin metal ring of small radial dimension, or a ring of substantially round or rectangular cross section, or a multi-turn helix of thin wire, such as 121 of FIGURE 10e. Or it can be a multiplicity of small particles or small volumes of material or irregular shape preferably with sharp corners, such as cubes, pyramids, etc., or spheres. These particles should be of material of a greater hardness than that of the elements, spaced over a circumferential strip or band in the zone of overlap, as illustrated as 120 or FIGURE 10b. When the two elements are driven together toward the outer confining ring under the explosive shock force, the small particles will be embedded in the mating surfaces of the said elements creating with said particles a pattern of projections and depressions, that effectively lock said elements together. Just as these particles should be of hard metal, the wires and rings should preferably be of harder metal than that of the elements so that the elements will be deformed about the interelement rings.

While the principles of our invention have been made clear by means of a number of illustrative embodiments, there will be immediately obvious to those skilled in the art many modifications in structure, arrangement, proportions, properties, material elements and components used in the practice of this invention, which may be particularly adapted for specific environments and operating requirements, all of which are contemplated to be embraced within this invention.

What we claim is:

1. The method of simultaneously explosively deforming a pair of overlapping cylindrical portions of tubular metal elements outwardly against an encircling metal ring to create a pattern of interlocking projections and depressions in the mating surfaces of the said elements in the overlapping portion comprising, inserting the smaller tubular element into the larger element to form an overlap section, placing said overlapped elements inside an encircling metal ring closely fitting the outer surface of the larger element, the inner surface of said ring departing from the form of a cylindrical surface said ring approximately centered over the said overlap section, inserting into the inner element, approximately centered in the said overlap section, an explosive assembly capable of exerting on the inner surface of the inner element an explosive detonation shock force that is sufficient to simultaneously bulge said overlapping cylindrical portions to form a pattern of interlocking projections and depressions, and detonating said explosive assembly, whereby said pattern is formed.

2. The method of claim 1 in which the inner surface of said ring comprises a cylindrical surface with a pattern of projections around which said layers are deformed by said force.

3. The method of claim 1 in which said inner surface of said ring comprises at least a portion of a toroidal surface.

4. The method as in claim 1 in which said ring is comprised of at least two parts which can be removably clamped around said outer element.

5. The method as in claim 1 in which said explosive assembly is a volume of explosive composition of such size as to be in intimate shock force transmitting contact with the inner surface of said inner element.

6. The method as in claim 1 in which said explosive assembly comprises an elongated volume of explosive composition smaller in outer diameter than the inner diameter of said inner element, with the intervening cylindrical annular space filled with substantially non-porous incompressible deformable shock force transmitting material in intimate shock force transmitting contact with said composition and with said inner element.

7. The method as in claim 1 in which said encircling ring is of material having greater yield strength than the material of which said elements are constructed.

8. The method of simultaneously explosively deforming two layers of overlapping tubular metal elements removably positioned within an encircling tight fitting metal anvil having an internal cylindrical surface with a pattern of depressions therein, said layers simultaneously driven by explosive pressure inside the inner element into intimate contact with each other and with the interior surface of said anvil and bulged into said pattern of depressions, thus forming a pattern of interlocking ridges and depressions in the mating surfaces of said elements, comprising, inserting the smaller tubular element into the larger tubular element to form an overlap section, positioning and locking said anvil about said larger element with the plane of said pattern of depressions within the overlap section, inserting a volume of detonatable explosive composition inside said smaller element positioned substantially in the plane of said depressions, and in contact with the inside wall of said smaller element, detonating said explosive composition, and removing said anvil.

9. The method of claim 8 in which said pattern of depressions comprises at least one circumferential depression.

10. The method of claim 9 in which the axial dimension of said depression is at least equal to twice the wall thickness of said elements.

11. The method of claim 8 in which the amount of overlap of said elements is at least as great as the radius of said elements.

12. The method of claim 8 in which the amount of overlap is within the range of one to four times the radius of said elements.

13. The method of claim 8 in which the amount of explosive composition is at least equivalent in explosive effort to 25 grains of P.E.T.N.

14. The method of simultaneously explosively deforming two layers of overlapping cylindrical portions of tubular elements positioned within an encircling tight fitting metal ring outwardly against each other and against said metal ring encircling the outer element, to deform said layers into the contour of the internal surface of said ring, and to form in the mating surfaces of said elements at least one interlocking ridge and depression, comprising, inserting the smaller into the larger tubular element to form an overlap section, placing the overlapped layers into said ring so that the central transverse plane of said ring is symmetrically placed within the overlap section, preparing an explosive assembly by inserting an elongated volume of explosive composition into the central opening of a short cylindrical tube of explosive shock force transmitting material, the explosive composition in shock force transmitting contact with said transmitting material, inserting said explosive assembly into said inner element so that said material is in intimate shock force transmitting relation with said composition and with the inner surface of said inner element, and said assembly is positioned within said overlap section and opposite said ring said explosive assembly being capable of simultaneously bulging said cylindrical portions to form at least one interlocking ridge and depression in said mating surfaces, and detonating said explosive composition to bulge said cylindrical portions to form at least one interlocking ridge and depression in said mating surfaces.

15. The method as in claim 14 in which said ring has on its inner surface a circumferential ridge over which said layers are deformed.

16. The method as in claim 14 in which said ring is removable, and including the step of removing said ring.

17. The method of joining two tubular metal elements by inserting them into the ends of a short metal tube of slip fit dimension with said elements to form two overlap sections and simultaneously deforming the two layers of each of the two overlap sections into the contour of an encircling metal ring, whereby a pattern of interlocking projections and depressions are formed in the mating surfaces of said overlap sections, comprising, inserting a first end of a first element into a first end of said tube to form a first overlap section, inserting a first end of a second element into the second end of said tube to form a second overlap section, placing said tube into a removable encircling anvil having in its inner surface a pattern of depressions in the area of each overlap section, inserting an explosive assembly into said elements including a ring of shock force transmitting material in intimate contact with each of said first ends of said elements in said overlap sections, and in intimate contact with a volume of explosive composition, detonating said explosive composition, and removing said anvil.

18. The method as in claim 17, in which said metal tube carries an internal ridge substantially in its center by means of which the said elements are positioned so as to provide symmetrical overlap sections.

19. The method as in claim 17, in which said explosive assembly includes, in addition to the said rings of shock force transmitting material surrounding said volume of explosive composition, a ring of porous compressible material of diameter larger than the internal diameter of said elements and placed between said rings of shock force transmitting material, said ring of compressible material adapted to properly space said rings of transmitting material and center said explosive assembly between the ends of said elements.

20. The method as in claim 19, in which said explosive assembly is encased in a thin-walled flexible jacket.

21. The method as in claim 19, in which an internal ridge in said metal tube and an outer circumference of said ring of compressible material are adapted to cooperate whereby said explosive assembly is supported by said ring of compressible material in the center of said metal tube.

22. The method as in claim 21, in which said ridge in said metal tube contains a circumferential depression and said ring of compressible material contains a matching ridge of substantially the same diameter as said depression.

23. The method of locking together two telescoped cylindrical portions of tubular metal elements forming an overlap zone by simultaneously explosively deforming them by internal shock force outwardly against at least one encircling metal ring to form a pattern of interlocking projections and depressions in the mating surfaces of said elements comprising, placing on one of the mating surfaces of said elements in the zone of overlap a thin interelement ring of incompressible material, inserting the smaller tubular element into the larger to form a telescoped section with said interelement ring in the annular space between the two elements within the zone of overlap, placing said telescoped elements inside an encircling metal ring the internal surface of which departs from a cylindrical surface so that it facilitates the forming of interlocking projections and depressions in said mating surfaces closely fitting the outer surface of the larger element with the plane of said interelement ring substantially within the plane of said encircling ring and both rings axially placed within the telescoped section, inserting into the smaller element an explosive assembly capable of exerting on the inner surface of said smaller element an explosive detonation shock force that is sufficient to simultaneously bulge said cylindrical portions to form a pattern of interlocking projections and depressions in said mating surfaces, said assembly positioned within the telescoped section substantially in the plane of said encircling ring, and detonating said explosive assembly, whereby said telescoped layers are explosively driven together and against the encircling ring being simultaneously deformed about said encircling ring and said interelement ring to provide said pattern of interlocking projections and depressions.

24. The method as in claim 23, in which said interelement ring comprises a helix of metal of at least one turn.

25. The method as in claim 23 in which said interelement ring comprises at least one ring of metal.

26. The method as in claim 23 in which said interelement ring comprises a thin layer of material of the class of wax and grease.

27. The method as in claim 23 in which said interelement ring includes a multiplicity of small hard particles distributed over a circumferential band.

28. The method as in claim 23 in which said interelement ring comprises at least one ring of elastomeric material.

29. The method as in claim 28 in which said ring of elastomeric material comprises at least one "O" ring.

30. The method of simultaneously explosively deforming a pair of overlapping cylindrical portions of tubular metal elements positioned within an encircling tightly fitting metal ring, having an internal surface the contour of which departs from a cylindrical surface, whereby said layers are simultaneously driven by explosive shock force inside the inner element into intimate contact with each other and with the internal surface of said ring and deformed into the contour of said surface, thus forming at least one interlocking ridge and depression in the mating surfaces of said elements, comprising, inserting one end of the smaller tubular element into one end of the larger tubular element to form an overlap section, positioning said metal ring about said larger tubular element within the overlap section, inserting into the smaller element within the overlap section an explosive assembly capable of exerting on the inner surface of the smaller element an explosive detonation shock force that is sufficient to simultaneously bulge said overlapping cylindrical portions to form at least one interlocking ridge and depression, and detonating said explosive assembly to bulge said portions to form at least one interlocking ridge and depression in said mating surfaces.

31. The method as in claim 30, with the added step of removing said ring.

32. The method as in claim 30, in which said ring is composed of a plurality of parts and step (2) comprises separating the parts of said ring, placing them about the outside of said larger element, and clamping them in place.

33. The method as in claim 30, in which the amount of overlap of said elements is at least as great as the radius of said elements.

34. The method as in claim 30, in which the amount of overlap of said elements is within the range of from one to four times the radius of said elements.

35. The method of claim 30, including the additional preparatory step of placing in the annular space between the two overlapping tubular elements, and within the overlap section a thin interelement ring of incompressible material.

36. The method as in claim 30, in which the axial length of said ring is less than the axial length of said overlap section.

37. The method as in claim 30, in which the internal surface of said ring is cylindrical and its axial length is less than the axial length of said overlap section.

38. The method as in claim 30, in which said tubular metal elements are right circular cylindrical elements.

39. The method as in claim 30, including the intermediate steps of preparing said explosive assembly comprising preparing a volume of explosive composition, placing about the said composition a short tightly fitting tube of substantially nonporous, incompressible deformable shock force transmitting material of substantially the same outer diameter as the inner diameter of said smaller element.

40. The method of claim 39, in which the axial length of said ring is less than the axial length of said tube of shock force transmitting material.

41. The method as in claim 39, in which the internal surface of said ring is cylindrical and its axial length is less than the axial length of said tube of shock force transmitting material.

42. The method of claim 30, in which the inner surface of said ring comprises a cylindrical surface with a pattern of depressions into which the said elements are bulged.

43. The method of claim 42, in which said pattern of depressions includes at least one circumferential depression.

44. The method of claim 43, in which the axial dimension of said depression is at least equal to twice the wall thickness of said elements.

References Cited by the Examiner
UNITED STATES PATENTS
2,412,886 12/1946 Huston et al. _____ 29—157.4 X
2,779,279 1/1957 Maiwurm _____ 29—421 X

FOREIGN PATENTS
766,741 1/1957 Great Britain.

JOHN F. CAMPBELL, *Primary Examiner.*

THOMAS H. EAGER, *Examiner.*